(12) United States Patent
Fernandes et al.

(10) Patent No.: US 12,018,119 B2
(45) Date of Patent: Jun. 25, 2024

(54) COPOLYESTERS OF 2,4-FDCA WITH INCREASED CRYSTALLIZATION CONTROL

(71) Applicant: Braskem S.A., Camacari-BA (BR)

(72) Inventors: Felipe Cicaroni Fernandes, Campinas (BR); Iuri Estrada Gouvea, Campinas (BR); Bárbara Mano, Campinas (BR)

(73) Assignee: BRASKEM S.A., Camacari (BR)

( * ) Notice: Subject to any disclaimer, the term of this patent is extended or adjusted under 35 U.S.C. 154(b) by 100 days.

(21) Appl. No.: 17/586,535

(22) Filed: Jan. 27, 2022

(65) Prior Publication Data
US 2022/0243006 A1 Aug. 4, 2022

Related U.S. Application Data

(60) Provisional application No. 63/143,648, filed on Jan. 29, 2021.

(51) Int. Cl.
*C08G 63/40* (2006.01)
*C08G 63/183* (2006.01)

(52) U.S. Cl.
CPC ........... *C08G 63/183* (2013.01); *C08G 63/40* (2013.01)

(58) Field of Classification Search
USPC ....................................................... 528/120
See application file for complete search history.

(56) References Cited

U.S. PATENT DOCUMENTS

2015/0291733 A1 10/2015 Hess et al.
2018/0355100 A1 12/2018 Poulat et al.

FOREIGN PATENT DOCUMENTS

EP    3235848 A1 * 10/2017
WO    2018089600 A1    5/2018

OTHER PUBLICATIONS

Sami Zaidi et al., "Highly transparent films of new copolyesters derived from terephthalic and 2,4-furandicarboxylic acids", Polymer Chemistry, vol. 10, No. 39, Jan. 1, 2019, pp. 5324-5332 (10 pages).
Shanmugam Thiyagarajan et al., "Biobased furandicarboxylic acids (FDCAs): effects of isomeric substitution on polyester synthesis and properties", Green Chemistry, Royal Society of Chemistry, GB, vol. 16, Jan. 1, 2014, pp. 1957-1966 (10 pages).

* cited by examiner

*Primary Examiner* — Terressa Boykin
(74) *Attorney, Agent, or Firm* — Morgan, Lewis & Bockius LLP

(57) ABSTRACT

The present disclosure provides a copolyester including a dicarboxylic acid component A comprising a terephthalic acid residue or ester-forming derivative thereof, or a mixture thereof, and a 2,4-furandicarboxylic acid residue or ester-forming derivative thereof, or a mixture thereof, and a diol component B comprising an alkanediol residue having from 2 to 22 carbon atoms, wherein the dicarboxylic acid component A has a total molar content, and wherein the 2,4-furandicarboxylic acid residue or ester-forming derivative thereof, is present in an amount of from 0.1 to 10 mol %, with respect to the total molar content of the dicarboxylic acid component A. Inventive copolyesters have a slower crystallization rate, a higher gas barrier to $CO_2$ and $O_2$ and a higher ratio of $^{14}C$ to $^{12}C$ as measured by ASTM D6866 when compared to a comparable copolyester comprising isophthalic acid instead of 2,4-furandicarboxylic acid.

36 Claims, No Drawings

COPOLYESTERS OF 2,4-FDCA WITH INCREASED CRYSTALLIZATION CONTROL

CROSS-REFERENCE TO RELATED APPLICATIONS

This application claims priority under 35 U.S.C. § 119(e) from U.S. Provisional Application Ser. No. 63/143,648, filed Jan. 29, 2021, all of which is hereby incorporated by reference in its entirety.

BACKGROUND

The present invention generally relates to inventive terephthalate copolymers and, more particularly, to poly(ethylene terephthalate) copolymers.

Poly(ethylene terephthalate), more commonly referred as PET, is one of the most relevant commodity polymers in the market thanks to its diverse end use, from polyester textile fibers to carbonated soft drink (CSD) bottles. PET is obtained through the polycondensation reaction between ethylene glycol and either terephthalic acid (TPA) or dimethyl terephthalate (DMT), which results in a linear condensation polymer.

Typical reaction between these units is comprised of a first condensation step followed by a solid-state polymerization. These steps will produce PET grades with different molecular weights, which are traditionally reported as intrinsic viscosity (IV) values. Depending on the IV, the resulting PET will be used in fiber applications (IV<0.65) or as resin (IV between 0.65 and 1.2).

PET resin has paramount importance in industry thanks to its usage in bottles. In this process, PET of IV>0.65 is blow-molded to produce bottles that can be used as vessels for water, CSD, spirits, dairy products and so on. This processing methodology is responsible for not only producing shaped articles, but also for changes in the properties of the PET by stretching the polymer chains, which become oriented due to the action of strain induced during the transformation.

Nevertheless, this strain is relaxed over time due to a mechanism referred to as physical aging, which ultimately increases the crystallization degree of post-processing PET resin articles that have undergone post-processing including but not exclusively, blow-molding. As a consequence, PET articles tend of have a gradual increase in haziness and a decrease in barrier and mechanical properties over time that compromises the shelf-life of bottled products. This has massive logistic impacts, limiting storage and transport time and leading to a higher plastic consumption.

To overcome this challenge, manufacturers have been typically adding small quantities of comonomers in the polymer formulation to introduce chain defects that decrease the crystallization rate. Isophthalic acid, a meta-isomer of terephthalic acid, has been traditionally used in amounts of between 1-3 mol % regarding the diacid content in bottle-grade resins to extend the shelf-life of these products.

Examples of the use of 2,5-FDCA in PET comonomers for crystallization are found in the art. For instance, US. Pat. No. 2018/0355100 A1 teaches about the utilization of bio-monoethylene glycol (bio-MEG) in bio-PET combined with bio-sourced 2,5-furandicarboxylic and its esters for a particular control of the crystallization rate of the resulting bio-PET. Similarly, WO 2018089600 A1 teaches that 2,5-FDCA can be used as crystallization control comonomer in PET compositions produced with bio-MEG. But despite their sustainable appeal and proven performance, to date, none of these routes to produce 2,5-FDCA have matured enough to show commercialization in the near future. One of the major barriers to use 2,5-FDCA over isophthalic acid in PET compositions is associated with the high cost of producing furan derivative, increasing the price of the resulting resin, composition and resulting articles. The addition of comonomers in PET for crystallization control is a practice that typically increases the operational costs given the higher prices practiced for isophthalic acid and other similar molecules in comparison to TPA and monoethylene glycol. Therefore, there is a cost barrier for any prospected molecule to act as a competitive crystallization rate modulator, limiting the number of candidates able to be industrially available. Compared with isophthalic and terephthalic acid, the furanic derivative has an approximate production cost per ton twice as high, thus undermining the technical and sustainable potential of this platform.

There is, therefore, a need for improved copolyesters having improved crystallization control and increased bio-based content. Such copolyesters are desired in part to reduce the dependence of the polyester chain on fossil feedstock, and therefore reduce the susceptibility to fluctuation in prices and therefore margins on oil prices.

SUMMARY

The present disclosure provides a copolyester comprising a dicarboxylic acid component A comprising: a terephthalic acid residue or ester-forming derivative thereof, or a mixture thereof, and a 2,4-furandicarboxylic acid residue or ester-forming derivative thereof, or a mixture thereof, and a diol component B comprising an alkanediol residue having from 2 to 22 carbon atoms, wherein the dicarboxylic acid component A has a total molar content, and wherein the 2,4-furandicarboxylic acid residue or ester-forming derivative thereof, is present in an amount of from 0.1 to 10 mol % with respect to the total molar content of the dicarboxylic acid component A. In some embodiments the copolyester has a slower crystallization rate compared to a comparable copolyester comprising isophthalic acid instead of 2,4-furandicarboxylic acid. In some embodiments the copolyester has a higher gas barrier to $CO_2$ and $O_2$ of at least 10% when compared to a comparable copolyester comprising isophthalic acid instead of 2,4-furandicarboxylic acid as measured by ASTM D1927-20. In some embodiments the copolyester has a higher ratio of $^{14}C$ to $^{12}C$ as measured by ASTM D6866 when compared to a comparable copolyester comprising isophthalic acid instead of 2,4-furandicarboxylic acid. In some embodiments the copolyester has an intrinsic viscosity (IV) of from 0.5 dL $g^{-1}$ to 1.2 dL $g^{-1}$, as measured according to ASTM D4603-96, at 30° C. in a 0.5 wt % solution of 60/40 phenol/1,1,2,2-tetrachloroethane.

In some embodiments the dicarboxylic acid component A has a total molar content and the 2,4-furandicarboxylic acid residue or ester-forming derivative thereof is present in an amount of from 0.5 to 5 mol %, for example from 1 to 3 mol %, with respect to the total molar content of the dicarboxylic acid component A. In some embodiments the dicarboxylic acid component A has a total molar content and the terephthalic acid residue is present in an amount of from 96.5 mol % to about 99.9 mol %, with respect to the total molar content of the dicarboxylic acid component A.

In some embodiments the alkanediol residue is a branched or linear alkanediol having from 2 to 12 carbon atoms, for example from 4 to 6 carbon atoms, while in other embodiments the alkanediol residue is a cycloalkanediol having from 5 to 10 carbon atoms. The alkanediol residue may comprise a monoethylene glycol residue, a propylene glycol residue, and/or a butylene glycol residue. In some embodiments diol component B comprises two or more of a monoethylene glycol residue, a propylene glycol residue, and a butylene glycol residue. In some embodiments the alkanediol residue is of bio-based origin.

In some embodiments the diol component B has a total molar content and the monoethylene glycol is present in an amount of 92.5 mol % or greater, with respect to the total molar content of the diol component B. In some embodiments the diol component B has a total molar content and wherein the monoethylene glycol is present in an amount of 95 mol % or greater with respect to the total molar content of the diol component B, for example the monoethylene glycol may present in an amount of 99 mol % or greater with respect to the total molar content of the diol component B or diol component B may consist essentially of monoethylene glycol.

The diol component B may further comprise an additional hydroxyl-containing residue. In some embodiments the diol component B has a total molar content, wherein the additional hydroxyl-containing residue is present in an amount of about 7.5 mol % or less of the total molar content of diol component B. In some embodiments additional hydroxyl containing residue is present in an amount of about 1 mol % or less, for example about 0.5 mol % or less, of the total molar content of diol component B. In some embodiments the additional hydroxyl-containing residue is selected from 1,3-propanediol, 1,4-butanediol, 1,5-pentanediol, 2-methyl-1,4-pentanediol, 3-methyl-2,4-pentanediol, trimethyl-1,3-pentanediol, 2-ethyl-1,3-hexanediol, 2,2-diethyl-1,3-propanediol, 1,3-hexanediol, 1,4-di(hydroxyethoxy)benzene, 2,2-bis(4-hydroxycyclohexyl)propane, 2,4-dihydroxy-1,1,3,3-tetramethylcyclobutane, 2,2-bis(3-hydroxyethoxyphenyl)propane, and 2,2-bis(4-hydroxypropoxyphenyl)propane.

The dicarboxylic acid component A may further comprise one or more additional diacid residues. In some embodiments the additional diacid residue is selected from isophthalic acid, naphthalenedicarboxylic acid, cyclohexanedicarboxylic acid, cyclohexanediacetic acid, 2,5-furandicarboxylic acid, succinic acid, glutaric acid, adipic acid, azelaic acid, sebacic acid, and combinations thereof.

The present disclosure also provides a method for preparing a copolyester comprising: subjecting a terephthalic acid or ester-forming derivative thereof, a 2,4-furandicarboxylic acid residue or ester-forming derivative thereof and a C2-C22 alkanediol to polycondensantion conditions and subjecting the polylcondensation reaction to solid-state polymerization, wherein the 2,4-furandicarboxylic acid residue or ester-forming derivative thereof is present in an amount of from 0.1 to 10 mol % with respect to a total molar content of the terephthalic acid or ester-forming derivative thereof and the 2,4-furandicarboxylic acid residue or ester-forming derivative thereof. In some embodiments the 2,4-furandicarboxylic acid residue or ester-forming derivative thereof, is present in an amount of from 0.5 to 5 mol %, for example from 1 to 3 mol %, with respect to a total molar content of the terephthalic acid or ester-forming derivative thereof and the 2,4-furandicarboxylic acid residue or ester-forming derivative thereof. In some embodiments the C2-C22 alkanediol is selected from monoethylene glycol, propylene glycol, and butylene glycol.

The present disclosure also provides an article comprising a copolyester comprising a dicarboxylic acid component A comprising: a terephthalic acid residue or ester-forming derivative thereof, or a mixture thereof, and a 2,4-furandicarboxylic acid residue or ester-forming derivative thereof, or a mixture thereof, and a diol component B comprising an alkanediol residue having from 2 to 22 carbon atoms, wherein the dicarboxylic acid component A has a total molar content, and wherein the 2,4-furandicarboxylic acid residue or ester-forming derivative thereof, is present in an amount of from 0.1 to 10 mol %, with respect to the total molar content of the dicarboxylic acid component A. In some embodiments the article further comprises one or more an additional polymer. In some embodiments the copolyester is layered adjacent to the additional polymer.

DETAILED DESCRIPTION

The present invention discloses innovative PET-based copolyesters compositions with advantageous properties and preparation thereof through the polycondensation and solid-state polymerization of terephthalic acid and monoethylene glycol in the presence of 2,4-FDCA, preferably obtained by fermentative processes of bio-based sources, as well as the application thereof as copolymer with enhanced crystallization rate control, barrier properties and increased renewable content suitable for the production of films, containers and articles such as bottles.

As used herein, the singular forms "a," "an," and "the" include plural referents unless the context clearly dictates otherwise. Thus, for example, reference to "a carboxylic acid" includes a plurality of such carboxylic acids and reference to "the diol" includes reference to one or more diols, and so forth.

As used herein, the terms "comprises," "comprising," "includes," "including," "has," "having," "contains," "containing," or any other variation thereof, are intended to cover a non-exclusive inclusion. A composition, mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive "or" and not to an exclusive "or."

In the present disclosure, the term "bio-based" or "bio-" indicates that the compound derives from biogenic materials, therefore with the inclusion of renewable carbon, where the biogenic carbon is traceable by $^{14}C$ isotopic measurements. One can also refer to "bio-based" as "renewable", "bio-sourced", "natural derived", "plant-derived" or "plant-" or "from natural origin".

The term "copolyester," as used herein, refers to a synthetic polymer prepared by the reaction of one or more di- or multifunctional hydroxyl compounds with one or more di- or multifunctional aliphatic carboxylic acids and one or more di- or multifunctional aromatic carboxylic acids.

The term "polyester," as used herein, is intended to include "copolyester."

The term "residue," as used herein, means any organic structure incorporated into a polymer through a catalytic and/or enzymatic polycondensation reaction from the corresponding monomer.

In addition to innovative copolyesters, the present invention also claims the advantageous application of the innovative copolyesters. Relative to prior-art, 2,4-PETF presents enhanced crystallization rate control, better relative gas barrier to $CO_2$ and $O_2$, as well as higher renewable content evidenced by $^{14}C$ measurements when compared to isophthalic acid and other diacids known in the art. Therefore, one skilled in the art can technically explore 2,4-PETF to improve the shelf-life of PET resin-made bottles, lower additivation requirements during polymerization, improve transparency, reduce haziness, enable thinner bottle walls and essentially have more reliable performance over the course of time.

Apart from the preferred use of 2,4-FDCA as comonomer to modify PET resins, this comonomer used to modify the properties of other polyesters also obtained from the combination of aromatic and aliphatic diacids with diols to produce poly(alkylene terephthalates) such as PBT and PPT.

In some aspects, the disclosure provides copolyesters comprising a dicarboxylic acid component A comprising: a terephthalic acid residue or ester-forming derivative thereof, or a mixture thereof, and a 2,4-furandicarboxylic acid residue or ester-forming derivative thereof, or a mixture thereof, and a diol component B comprising an alkanediol residue having from 2 to 22 carbon atoms, wherein the dicarboxylic acid component A has a total molar content, and wherein the 2,4-furandicarboxylic acid residue or ester-forming derivative thereof, is present in an amount of from 0.1 to 10 mol %, with respect to the total molar content of the dicarboxylic acid component A.

In some embodiments at least one of the components of copolyester is of renewable origin, i.e, is produced from renewable sources such as agricultural feedstock, agricultural waste, organic waste products, biomass, $CO_2$, CO and microorganisms that possess biogenic carbon as detectable by $^{14}C$ measurements carried out by ASTM 6866. In some embodiments the copolyesters described herein have a higher ratio of $^{14}C$ to $^{12}C$ as measured by ASTM D6866 when compared to a comparable copolyester comprising isophthalic acid instead of 2,4-furandicarboxylic acid. The component of renewable origin may be one or more of 2,4-FDCA, alkanediol, and one or more other components.

The intrinsic viscosity of the copolymer may affect the ability the process and prepare container preforms and containers with adequate mechanical integrity and performance. In some embodiments of the present invention, the copolyester presents an intrinsic viscosity (IV) from 0.5 dL g−1 to 1.2 dL g−1. The IV property is typically measured according to ASTM D4603-96, at 30° C. in a 0.5 wt % solution of 60/40 phenol/1,1,2,2-tetrachloroethane. In some embodiments the copolyester has an intrinsic viscosity (IV) of from 0.2 dL $g^{-1}$ to 1.5 dL $g^{-1}$, for example 0.5 dL $g^{-1}$ to 1.2 dL $g^{-1}$ or 0.7 dL $g^{-1}$ to 1 dL $g^{-1}$, as measured according to ASTM D4603-96, at 30° C. in a 0.5 wt % solution of 60/40 phenol/1,1,2,2-tetrachloroethane.

In another embodiment, the copolyesters described herein have a molecular weight, defined in the art as the average polymeric molecular weight obtained or simply Mn, in the a range of about 10 kDa to about 400 kDa, as measured by a method known in the prior art.

It is surprising that, due to the asymmetric nature of 2,4-FDCA, it can play a role in the crystallinity of polyesters, effectively controlling the crystallization rate whilst simultaneously increasing the barrier properties, even in small contents of 2,4-FDCA. In some embodiments the copolyesters described herein have a slower crystallization rate compared to a comparable copolyester comprising isophthalic acid instead of 2,4-furandicarboxylic acid.

In some embodiments the copolyesters described herein have a higher gas barrier to $CO_2$ and/or $O_2$ of at least 15%, for example at least 10% or at least 8%, when compared to a comparable copolyester comprising isophthalic acid instead of 2,4-furandicarboxylic acid as measured by ASTM D1927-20.

Dicarboxylic Acid Component A

Terephthalic Acid Residue

The diacid compound comprises terephthalate units. Typically, the terephthalate compound used to produce the bio-PET can be terephthalic acid or dimethyl terephthalate. Terephthalic acid with purity higher than 99%, typically marketed a "pure terephthalic acid", or "purified Terephthalic acid" or simply "PTA", is usually preferred to achieve polymers with an advantageous level of clarity.

In some embodiments the dicarboxylic acid component A has a total molar content and the terephthalic acid residue is present in an amount of from about 90 mol % to about 99.9 mol %, for example 95 mol % to about 99.9 mol %, or 96.5 mol % to about 99.9 mol %, with respect to the total molar content of the dicarboxylic acid component A.

2,4-Furandicarboxyhc Acid Residue

A 2,4-furandicarboxylic acid residue of the polyesters of the present invention includes 2,4-furandicarboxylic acid (2,4-FDCA), ester-forming derivatives thereof, e.g. 2,4 dimethyl furanoate, as well as mixtures of 2,4-FDCA, ester-forming derivatives thereof, and/or one or more aromatic dicarboxylic acids. In some embodiments a 2,4-FDCA or ester-forming derivative thereof can be used individually. In some embodiments a mixture of two or more aromatic dicarboxylic acids including 2,4-FDCA or an ester-forming derivative thereof, e.g. 2,4 dimethyl furanoate, may be used.

In some embodiments 2,4-furandicarboxylic acid or ester-forming derivatives thereof are incorporated in the polyesters in ratios of between 1 to 70 mol %, preferably between 20 and 60 mol %, more preferably between 30 and 50 mol % with respect to the total molar content of dicarboxylic acids.

2,4-FDCA is a new furan isomer that can be synthesized from renewable carbon sources with intrinsically low environmental impact. The optional utilization of renewable materials to produce 2,4-FDCA is a feature that permits the inventive copolymers to contain different levels of bio-based carbon, as typically assessed according to ASTM D6866. Moreover, the process is able to bring the production costs of this new isomer to levels compatible with those of terephthalic acid, therefore being advantageous for the production of the copolyesters herein described.

In some aspects, the renewable carbon source may be selected from sugars, glycerol, alcohols, organic acids, alkanes, fatty acids, lignocellulose, proteins, carbon dioxide, and carbon monoxide. Renewable carbon sources may preferentially be first generation sugars, such as sugar cane and sugar beet, wheat, corn or soy, waste streams and agricultural sources, such as second generation sugars, but are not restricted to such waste streams. In one aspect, the carbon source is a sugar. In one aspect, the sugar is a monosaccharide. In one aspect, the sugar is a polysaccharide. In one aspect, the sugar is glucose or an oligomer of glucose. In one aspect, the oligomer of glucose is selected from fructose, sucrose, starch, cellobiose, maltose, lactose and cellulose. In one aspect, the sugar is a five carbon sugar. In one aspect, the sugar is a six carbon sugar. In some aspects, the renewable carbon source (i.e., feedstock) comprises one or more five carbon sugars and/or one or more six carbon sugars. In some aspects, the feedstock comprises one or more of xylose, glucose, arabinose, galactose, maltose, fructose, mannose, sucrose, and/or combinations thereof. In some aspects, the feedstock comprises one or more of xylose and/or glucose.

In some aspects, the feedstock comprises one or more of arabinose, galactose, maltose, fructose, mannose, sucrose, and/or combinations thereof.

In another embodiment, 2,4-FDCA is produced via catalytic routes comprising several synthetic steps as described in Org. Proc. Res. Dev. 2003, 7, 1, 74-81, Anti-Infective Agents, 2012, 10, 55-71 and ACS Sustainable Chem. Eng. 2016, 4, 3, 1707-1714.

In another embodiment, 2,4-FDCA is produced enzymatically to produce bio-based 2,4-FDCA, for example, as described in U.S. Patent Application Publication No. 2020/0277639, the entire content of which is hereby incorporated by reference. In some embodiments a method of producing 2,4-FDCA comprises cultivating a recombinant microorganism in a culture medium containing a feedstock providing a carbon source until the 2,4-FDCA is produced. In some embodiments a method of producing 2,4-FDCA comprises cultivating a recombinant microorganism in a culture medium containing a feedstock providing a carbon source until the 2,4 FDME is further oxidized to 2,4 FDCA, through procedures known by one skilled in the art. The optional utilization of renewable materials to produce 2,4 FDCA is a feature that permits the inventive copolymers to contain different levels of bio-based carbon, as typically assessed according to ASTM D6866. The bio-based content can be expanded further by using bio-based monoethylene glycol and other bio-based glycols as other comonomers, such as isosorbide, mannitol, etc.

In another embodiment, the 2,4-FDCA or its derivative is obtained from bio-based or petrochemical sources and catalytic pathways, e.g., those described in U.S. Pat. Nos. 9,284,290, 8,455,668, and Green Chem., 2014, 16, 1957-1966, ACS Sustainable Chem. Eng. 2016, 4, 3, 1707-1714. U.S. Pat. Nos. 9,284,290 and 8,455,668 are incorporated by reference herein in their entireties. In some embodiments a method for synthesizing 2,4-FDCA by a disproportionation route comprises the following steps: a) oxidizing furfural compounds in the presence of catalysts and alkaline solution in order to obtain biobased furoic acid salts, wherein the catalysts are selected from the group consisting of $Au/TiO_2$, Au/C, Au/ZnO, Au/Fe2O3 or other Au catalysts; b) heating the furoic acid salts under stirring in the presence of a metal based catalyst to prepare a reaction mixture and cooling the reaction mixture until room temperature; c) collecting furan from the reaction mixture obtained in item b) in order to obtain the mixture of 2,4-FDCA and 2,5-FDCA; and d) subjecting the mixture obtained in item c) to an extraction or other separation method in order to collect and purify 2,4-FDCA.

In some embodiments the 2,4-furandicarboxylic acid residue or ester-forming derivative thereof is present in an amount of from 0.1 to 10 mol %, for example from 0.5 to 5 mol %, or 1 to 3 mol %, with respect to the total molar content of the dicarboxylic acid component A.

Additional Aromatic Dicarboxylic Acid Residue

In some embodiments, the dicarboxylic acid component A may further comprise one or more additional dicarboxylic acid ("diacid") residues. As used herein reference to a diacid residue includes carboxylic acids and corresponding ester-forming derivatives thereof. Accordingly, it is to be understood that reference herein to a diacid residue includes corresponding ester-forming derivatives thereof.

Suitable diacids for use in the copolyesters of the present invention include those having from 2 to 22 carbon atoms, for example from 4 to 16 carbon atoms or from 4 to 10 carbon atoms. However, suitable diacids for use in the copolyesters of the present invention may also have a larger number of carbon atoms, for example up to 30 carbon atoms, such as 2 to 30 carbon atoms, 4 to 30 carbon atoms, 10 to 30 carbon atoms or 16 to 30 carbon atoms.

Suitable diacid residues may be linear or branched aliphatic carboxylic acid compounds. Examples of suitable carboxylic acids include, but are not limited to, oxalic acid, malonic acid, succinic acid, glutaric acid, 2-methylglutaric acid, 3-methylglutaric acid, α-ketoglutaric acid, adipic acid, pimelic acid, azelaic acid, sebacic acid, brassylic acid, fumaric acid, 2,2-dimethylglutaric acid, suberic acid, diglycolic acid, oxaloacetic acid, glutamic acid, aspartic acid, itaconic acid, maleic acid, octadecandioic acid, ester-forming derivatives thereof, and mixtures thereof.

In some embodiments the additional diacid residue is selected from isophthalic acid, naphthalenedicarboxylic acid, cyclohexanedicarboxylic acid, cyclohexanediacetic acid, 2,5-furandicarboxylic acid, succinic acid, glutaric acid, adipic acid, azelaic acid, sebacic acid, and combinations thereof.

In some embodiments the additional diacid residue is present in a quantity no greater than 5 mol % with respect to the total molar content of the dicarboxylic acid component A. For example, the additional diacid residue may be present in an amount of about 3.5 mol % or less, about 2.5 mol % or less, about 1 mol %, or about 0.5 mol % or less. In some embodiments the additional diacid is present in an amount of about 0.5 mol % to about 5 mol %, or about 1 mol % to about 4 mol %.

Diol Component B

In some embodiments, diol component B comprises at least one alkanediol residue or alkenediol residue. In some embodiments at least one alkanediol residue is selected from branched or linear alkanediols having from 2 to 22 carbon atoms, for example 2 to 12 carbon atoms, 4 to 6 carbon atoms, or a mixture of two or more thereof. In some embodiments the at least one alkanediol residue is selected from cycloalkanediols having from 5 to 22 carbon atoms, for example 5 to 10 carbon atoms, or a mixture of two or more thereof. In some embodiments at least one alkenediol residue is selected from branched or linear alkenediols having from 2 to 22 carbon atoms, for example 2 to 12 carbon atoms, 4 to 6 carbon atoms, or a mixture of two or more thereof. In some embodiments the at least one alkenediol residue is selected from cycloalkenediols having from 5 to 22 carbon atoms, for example 5 to 10 carbon atoms, or a mixture of two or more thereof. In some embodiments the at least one alkenediol is selected from cycloalkenediols having from 5 to 22 carbon atoms, for example 5 to 10 carbon atoms, or a mixture of two or more thereof.

Examples of suitable alkanediol, cycloalkanediol, alkenediol and/or cycloalkenediol residues include, but are not limited to, ethylene glycol, 1,2-propanediol, 1,3-propanediol, 1,2-butanediol, 1,4-butanediol, 1,5-pentanediol, 2-methyl-1-5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, and in particular ethylene glycol, 1,3-propanediol, 1,4-butanediol, and 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol, 2,2,4,4-tetramethyl-1,3-cyclobutanediol, 2,5-bis(hydroxymethyl)

furan and 2,4-bis(hydroxymethyl)furan. It is also possible to use a mixture of various alkanediols and/or alkenediols.

In some embodiments the alkanediol residue may comprise a monoethylene glycol (MEG) residue, a propylene glycol residue, and/or a butylene glycol residue. In some embodiments diol component B comprises two or more of a monoethylene glycol residue, a propylene glycol residue, and a butylene glycol residue.

In some embodiments, diol component B is of bio-based origin.

In some embodiments, diol component B comprises at least 92.5 mol % of monoethylene glycol, preferably 99 mol % and even more preferably 100 mol %. Nevertheless, diethylene glycol moieties are often inherently found in resulting copolyester chain as a consequence of their formation during the polymerization stage, as the condensation product between two monoethylene glycol units. Therefore, diethylene glycol may be found in the resulting chain even though it is not deliberately added as a compound. The molar concentration of diethylene glycol units in the copolyester is preferably less than 3.5 mol % in relation to the total molar content of diol component B, and more preferably less than 1 mol %. The control of the formation of diethylene glycol, including selection of the right polymerization catalysts including lithium acetate dehydrate to reduce the amount of diethylene glycol formed in this step is taught in U.S. Pat. No. 3,830,759A, which is hereby incorporated by reference in its entirety.

In a preferred embodiment, all or the majority of the MEG is obtained from a bio-based source that permits the copolyester composition to contain different levels of bio-based carbon, as typically tested and measured according to ASTM D6866. Bio-MEG can be obtained from different routes such as fermentation and hydrogenolysis and hydroformylation as amply described in U.S. Pat. No. 6,297,409 B, US 2008/0228014 A1, U.S. Pat. Nos. 4,496,781 B1, 4,321,414 A, 4,200,765 B1, 4,321,414B1, 4,317,946 B1, EP 0 002 908 B1, U.S. Pat. Nos. 5,210,337 B1, 9,695,276, US. Pat. No. 2018/0355100 A1 and U.S. Pat. No. 9,926,247 B2, each of which is incorporated by reference in its entirety.

In some embodiments diol component B is present in an amount of from about 95 to 105 mol % based on acid component A. In some embodiments diol component B is present in an amount of from about 98 to 102 mol % based on acid component A. In some embodiments diol component B is present in an amount of about 100 mol % based on acid component A.

Hydroxyl-Containing Additives

In some embodiments the disclosed copolyester might also contain less than 7.5 mol % based on diol component B, for example, less than 5 mol % based on diol component B, less than 1 mol % based on diol component B, and less than 0.5 mol % based on diol component B of other hydroxyl-containing compounds. Such other hydroxyl-containing compounds may be added to for control of properties of the copolyester and not be inherently present in the copolyester composition comprising monoethylene glycol. These hydroxyl-containing compounds might include compounds known in the art such as 1,3-propanediol, 1,4-butanediol, 1,5-pentanediol, 2-methyl-1,4-pentanediol, 3-methyl-2,4-pentanediol, trimethyl-1,3-pentanediol, 2-ethyl-1,3-hexanediol, 2,2-diethyl-1,3-propanediol, 1,3-hexanediol, 1,4-di(hydroxyethoxy)benzene, 2,2-bis(4-hydroxycyclohexyl)propane, 2,4-dihydroxy-1,1,3,3-tetramethylcyclobutane, 2,2-bis(3-hydroxyethoxyphenyl)propane, and 2,2-bis(4-hydroxypropoxyphenyl)propane.

Compositions and Articles

Applications for the inventive copolyesters with improved properties include films, in particular mono- and biaxially oriented films, multilayered films with other polymeric materials, blow-molded films and articles, injection-molded articles, extrusion coatings, extruded and coextruded fibers, blended composite fibers, nonwoven fibers, etc.

In some embodiments a copolyester according to the present invention can be used in a multilayered film, coextrusion or blended composite with one or more other polymers to form a composition. In some embodiments a polyester according to the present invention may be blended with a polyolefin, an aliphatic and semiaromatic polyester that may or may not be biodegradable, a polyamide, a polyurethane, a polycarbonate, a polyurethane, a polyurea, a polyacid, a polymer totally obtained from bio-based resources, a polyacid or another biodegradable polymer such as an aliphatic-aromatic copolyester with a different structure, a polyester such as polylactic acid (PLA), a modified natural polymer such as thermoplastic starch, or a mixture thereof. In some embodiments it is preferred to blend a copolyester according to the present invention with one or more other biodegradable polymers such as an aliphatic-aromatic copolyester with a different structure, a polyester such as polylactic acid (PLA), and modified natural polymers such as thermoplastic starch.

In some embodiments a composition of the present invention may further include one or more additives to improve characteristics, including but not restricted to: i) fillers to reduce costs and/or improve mechanical properties, such as talc, mica and other inorganic fillers, organic fillers and fibers such as lignocellulosic fibers and biochar; ii) nucleating agents to control tacking, and other usual additives to polyesters known by one skilled in the art.

In some embodiments copolymers and/or compositions of the present invention are particularly suitable to be used, when appropriately processed, to produce packaging articles such as containers, bottles, flasks and/or vessels using methods including, but not limited to, injection molding and stretch blow molding.

In some embodiments, the copolyesters and compositions herein disclosed and articles thereof can be sorted and recycled in conventional methods and under recycling operational conditions known by the one skilled in the art. In some embodiments a packaging article produced with a copolyester or composition herein disclosed is mechanically recycled in the form of chips or granules. Therefore, the resulting chips and granules will typically retain some biogenic carbon content as measurable by $^{14}C$ methods. The resulting chips or granules might be reprocessed into the same or different PET-based packaging articles using the processing techniques and conditions known by one skilled in the art. The reprocessing might happen together, but not exclusively, with PET from petrochemical sources or chips and granules obtained by the recycling of petrochemical-PET, as well as from biogenic sources.

Methods

Due to its similar reactivity, 2,4-FDCA can be incorporated in PET formulations by polycondensation and solid-state polymerization methodologies known in the art. This step can be reproduced with either bio-based or oil-based 2,4-FDCA.

For example, in some embodiments copolyesters described herein can be produced by a process comprising subjecting a terephthalic acid or ester-forming derivative thereof, a 2,4-furandicarboxylic acid residue or ester-forming derivative thereof and a C2-C22 alkanediol to polycondensantion conditions and subjecting the polylcondensation reaction to solid-state polymerization, wherein the 2,4-furandicarboxylic acid residue or ester-forming derivative thereof is present in an amount of from 0.1 to 10 mol % with respect to a total molar content of the terephthalic acid or ester-forming derivative thereof and the 2,4-furandicarboxylic acid residue or ester-forming derivative thereof. In some embodiments the 2,4-furandicarboxylic acid residue or ester-forming derivative thereof, is present in an amount of from 0.5 to 5 mol %, for example from 1 to 3 mol %, with respect to a total molar content of the terephthalic acid or ester-forming derivative thereof and the 2,4-furandicarboxylic acid residue or ester-forming derivative thereof. In some embodiments the C2-C22 alkanediol is selected from monoethylene glycol, propylene glycol, and butylene glycol.

Properties of the copolymers resulting from this reaction, herein referred as 2,4-PETF or simply as inventive copolyesters, can be tuned according to variations in the terephthalic acid: 2,4-FDCA molar ratio. In a preferred embodiment, the present disclosure comprises copolyesters with 2,4-FDCA ratios ranging from 0.1 to 10 mol % in relation to the total dicarboxylic acid component A content.

EXAMPLES

Example 1

The in vivo production of 2,4-FDCA by a recombinant microorganism as described in U.S. patent application Ser. No. 16/806,728 from glucose was evaluated in shake flask fermentations in triplicate, using a defined media comprising about 2.2 g/L $KH_2PO_4$, 9.4 g/L $K_2HPO_4$, 1.3 g/L $(NH_4)_2SO_4$, 10 mg/L thiamine, 320 mg/L EDTA-NaOH, 2 mg/L $CoCl_2 \cdot 6H_2O$, 10 mg/L $MnSO_4 \cdot H_2O$, 5 mg/L $CuSO_4 \cdot 5H_2O$, 2 mg/L $H_3BO_3$, 2 mg/L $Na_2MoO_4 \cdot 2H_2O$, 54 mg/L $ZnSO_4 \cdot 7H_2O$, 1 mg/L $NiSO_4 \cdot 6H_2O$, 100 mg/L citrate Fe (III), 100 mg/L $CaCl_2 \cdot 2H_2O$, 0.3 g/L $MgSO_4 \cdot H_2O$. Carbon source was provided by 10 g/L glucose and nitrogen sulphate was used as nitrogen source for the production of 2,4-FDCA. Erlenmeyer flasks were inoculated with the recombinant strain to an initial optical density (OD600) of 0.1, and incubated at 37° C., 225 rpm for about 48 hours. Analysis of supernatant in 48 hours by high-performance liquid chromatography (HPLC) indicated the production of 14±2 mg/L 2,4-FDCA. The term "EDTA-NaOH" as used herein, refers to the soluble salt of ethylenediaminetetraacetic acid (EDTA) and sodium hydroxide (NaOH).

Example 2

A study investigated a non-limiting example of a procedure of preparing the 2,4-FDCA.

In this non-limiting example, the procedure for synthesizing 2,4-FDCA by a disproportionation route comprises the following steps: a) oxidizing furfural compounds in the presence of catalysts and alkaline solution in order to obtain biobased furoic acid salts, wherein the catalysts are selected from the group consisting of $Au/TiO_2$, Au/C, Au/ZnO, $Au/Fe_2O_3$ or other Au catalysts; b) heating the furoic acid salts under stirring in the presence of a metal based catalyst to prepare a reaction mixture and cooling the reaction mixture until room temperature; c) collecting furan from the reaction mixture obtained in item b) in order to obtain the mixture of 2,4-FDCA and 2,5-FDCA; and d) subjecting the mixture obtained in item c) to an extraction or other separation method in order to collect and purify 2,4-FDCA. The procedure is described in more details below.

Procedure for Preparing Furoic Acid from Furfural: Oxidation of Furfural

Furfural (3.00 grams, 31.22 mmol) was dissolved in 40 ml water. One equivalent (31.75 mmol; 1.02 eq) of base (NaOH) and 0.012 grams of $Au/TiO_2$ catalyst (ex-Strem-Autek; 1.2 wt. % Au, Au particle size 2-3 nm) were added to the furfural solution in water. The 100 ml reaction vessel (Büchi glasuster picoclave) was closed and overhead stirring was applied. Oxygen pressure (303974.99 Pa of O2) was applied to the reaction mixture. The reaction mixture was put at 50° C. After one hour reaction the pressure has dropped to approximately one atmosphere and the reaction vessel was repressurised to 303974.99 Pa of $O_2$ and subsequently stirred overnight. After overnight stirring the reaction was stopped and the catalyst was filtered off. The solvent (water) was removed by a rotary evaporator and applying vacuum. The yield of sodium furoate was 94.9%.

The use of gold catalysts in the above reaction often is a little bit more selective than other metal based catalysts such as Pt or Pd and under the circumstances used in the reaction, the combination of a heterogeneous catalyst that acts under the same basic conditions required for the subsequent disproportionation reaction is advantageous.

This reaction demonstrates the efficiency in obtaining furoate salts from furfural, that can serve as input for the subsequent disproportionation reaction.

Process for Production of a Mixture of 2,4-FDCA and 2,5-FDCA 6.00 grams of K-furoate (39.95 mmol) and 2.20 grams of $CdI_2$ (6.01 mmoles) were grinded together well and charged into a 3-necked flat flange reaction vessel. The mixture was then heated in a salt bath at 265° C. with stirring using a mechanical overhead stirrer under continuous (very slow) flow of nitrogen. During the course of reaction, the furan formed was collected via a Dean-Stark trap and an $CO_2$/Acetone ice bath (−78° C.), yielding furan of 1.35 grams (95% of the theoretical amount). After 4 hours, the reaction was stopped and allowed to cool down at room temperature for 1 h. Thus obtained black hard solid substance was dissolved in water (50 mL). A residual amount of water insoluble black material was filtered off and the deep yellow colour filtrate was acidified using 12 N HCl (until pH:1). 2,5-FDCA was precipitated and filtered off. 60.9% of the theoretical amount of 2,5-FDCA was isolated. NMR analysis of the reaction mixture after filtering off the insoluble black material showed that the K-furoate had been converted over 90% and that there is a mixture being present of 2,4-FDCA and 2,5-FDCA, in a ratio of 0.32:0.68. Based upon this and the 60.9% of 2,5-FDCA isolated, it can be calculated that the K-furoate has been disproportionated into a mixture of furandicarboxylic acids in 89% of the theoretical yield.

Procedure for Purification of 2,4-Furandicarboxylic Acid (2,4-FDCA)

The reaction crude mixture (2,4-FDCA, 2,5-FDCA, 2-Furoic acid and CdI2) was subjected to soxhlet extraction using acetone for 8 h. After cooling to room temperature, acetone insoluble white crystalline powder was analyzed by NMR which showed no proton signals. The acetone soluble part was recovered and the solvent was evaporated under reduced pressure in the rotatory evaporator. The NMR analysis showed the presence of 2,4-FDCA, 2,5-FDCA and 2-Furoic acid in the crude mixture. The mixture was then stirred vigorously with chloroform for 10 min at room temperature and filtered. This process was repeated until 2-furoic acid was completely removed from the mixture. The product was then dried in a vacuum oven at 40° C. for 12 h. As the solubility difference of 2,4-FDCA was comparatively high in acetone at room temperature, the same technique (adapted with chloroform previously) was repeated with acetone to separate the 2,4-FDCA from 2,5-FDCA. Thus acetone soluble part was separated, combined together and evaporated under reduced pressure in a rotatory evaporator yielded 2,4-FDCA, which was not 100% qualitative, but not less than 85% purity and the investigation is in progress to find the more precise way to get 100% pure compound of 2,4-FDCA.

The use of the process described herein allows 2,4-FDCA yields of at least 7 wt. %, preferably at least 15 to 20 wt. %, more preferably 32 wt. % at least (the remaining fraction of the products is basically 2,5-FDCA). The 2,4-FDCA is produced from cheap and renewable stock feeds, e.g. furfural, through a simple 2-step process which produces no harmful, toxic or undesirable byproducts (the main byproduct furan has actually highly interesting applications).

Example 3

A study investigated a non-limiting example of a procedure of preparing the 2,4-FDCA.

In a 250 mL jacketed glass reactor, dihydroxyacetone (10.0 g, 0.11 mol, 1 eq) was dissolved in deionized water (100 mL). The solution was cooled down to 0° C., and Ambersep-900 basic ion exchange resin (27.8 g) was added. The mixture was then stirred at 0° C. for 24h. After filtration to remove the resin, the product was freeze-dried.

In a 100 mL round-bottom flask, the product was redissolved in DMSO (50 mL), to which was added Amberlyst-15 acidic ion exchange resin (5.0 g). The set-up was equipped with a Dean-Stark apparatus for collecting the water generated during the dehydration. The mixture was stirred at 110° C. for 5 h and then cooled down to room temperature and filtered. The filtrate was concentrated under vacuum to remove most DMSO, keeping the temperature below 50° C. Next, the product was extracted by a dichloromethane/NaHCO₃ (1M) separation. The organic layer was dried over anhydrous sodium sulfate and the solvent was evaporated under reduced pressure. The final product (mixture of 4- and 5-HMF) was obtained as a brown viscous.

In a 250 mL round-bottom flask, 4-HMF was dissolved in a sodium hydroxide aqueous solution (9.2 g NaOH in 100 mL of deionized water). The mixture was cooled down to 0° C., and potassium permanganate (3.4 g, 22 mmol, 34 eq) was added. Then, the solution was stirred at 0° C. for 15 min. The precipitate of manganese oxide was filtered off, and a concentrated HCl solution was carefully added to the filtration to bring the pH into 1, while keeping the temperature below 5° C. The resulting mixture was extracted with diethyl ether (×2). The organic layer was dried over anhydrous sodium sulfate and concentrated in vacuo. The product was obtained as a yellow powder.

Example 4

A study investigated a non-limiting example of a procedure of preparing an inventive copolyester of the present disclosure In a typical reaction, the novel copolyester was produced with various amount (mol %) of 2,4-FDCA and terephthalic acid in an excess of monoethylene glycol (molar ratio of diol/diacid=1.6) according to the scheme presented in Figure 1. The catalyst (1% w/w of Sb₂O₃) was placed in a two-necked round-bottom flask. Under the protection of argon, the transesterification was started when the system was heated to 180° C. This step was considered to be over within 3 h. For the melt polycondensation stage, the pressure was slowly reduced to 0.04 mbar. Then the reaction temperature was increased to 250° C. and this step was continued for 4 h. Finally, the reaction pressure was returned to normal atmospheric pressure and the copolyester was obtained as a grey powder after being washed by methanol and dried at 90° C. Copolyesters with PTA/2,4-FDCA molar ratios of 98/2 and 94/6 were produced as inventive copolyesters, and a comparative example was produced with 100/(i.e. no 2,4-FDCA).

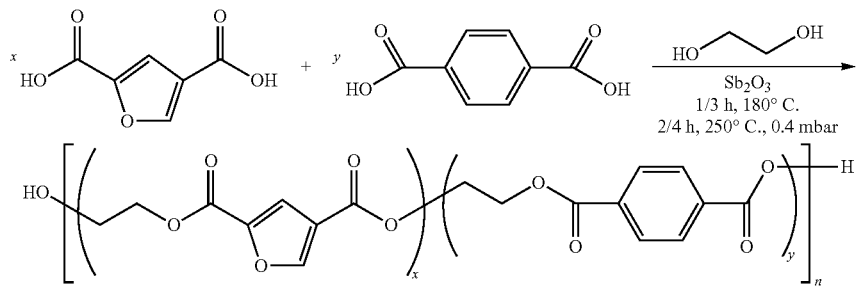

Figure 1: Scheme for production of inventive copolyesters herein disclosed.

Example 5

A study investigated a non-limiting example of the chemical properties of inventive copolyesters of the present disclosure The chemical structure of products was determined by ¹H nuclear magnetic resonance (¹H NMR) with a 300 MHz Bruker NMR spectrometer in deuterated chloroform (CDCl₃) with few drops of trifluoroacetic acid (TFA). The final molar composition of each copolymer was calculated from their ¹H NMR spectra, by comparing the integration values of furanic signals at 7.7 and 8.3 ppm and aromatic signal at 8.2 ppm. Resonance signals confirmed that the novel copolyester has been successfully prepared by polycondensation between terephthalic acid and monoethylene glycol in the presence of 2,4-FDCA. The synthesis was confirmed also confirmed by FTIR according the presence of the $\nu$ (=C—H) and $\nu$ (C=C) in 3140 and 1590 cm$^{-1}$ associated with the furan ring, respectively, and the $\nu$ (C=O) 1715 cm$^{-1}$ of the ester bond formed during the polymerization.

TABLE 1

Chemical characteristics of the inventive copolyesters and comparative example

| Property | Inventive Copolyester 1 | Inventive Copolyester 2 | Comparative Example |
|---|---|---|---|
| Feed PTA/2,4-FDCA Molar Ratio | 98/2 | 94/6 | 0/100 |
| Actual 2,4-FDCA Molar Ratio | 98.7/1.3 | 96.7/3.3 | 0/100 |

Example 6

A study investigated a non-limiting example of the thermal and optical properties of inventive copolyesters of the present disclosure.

The melting behavior of the inventive polyesters was recorded in a Differential Scanning calorimeter (DSC TA Instruments Q2000). The samples were heated at the speed of 10° C./min from −80° C. to 350° C. Thermogravimetric analysis (TGA) was carried out using TA Instruments TGA550. The samples were heated under nitrogen flow from 25° C. to 700° C. at 10° C./min. Optical properties such as transparency were investigated by spectroscopy in the region of UV and visible light wavelengths (300-800 nm) at room temperature of thick film samples. Data obtained from thermal and optical characterization obtained for the inventive copolyesters and the comparative example are presented in Table 2.

TABLE 2

Thermal and optical characteristics of the inventive copolyesters and comparative example

| Property | Inventive Copolyester 1 | Inventive Copolyester 2 | Comparative Example |
|---|---|---|---|
| $T_g$ (° C.) | 76.3-76.8 | 76.3-77.1 | 76.3 |
| $T_m$ (° C.) | 254-258 | 244 | 255 |
| $Td_{5\%}$ (° C.) | 365 | 344 | 415 |
| $Td_{max}$ (° C.) | 426 | 426 | 460 |
| Ash Content (%) | 12.1 | 7.4 | 12.9 |
| Normalized Transmitance (a.u.) | >1 | >1 | 1 |

It appears from the DSC results that the incorporation of 2,4-FDCA units into the PET structure leads to a decrease of the melting temperature (Tm) of the polyester. If the introduction of 1.3% of 2,4-FDCA conducts to no significant change in the Tm, the presence of 3.3% of 2,4-FDCA causes a decrease of Tm of around 14° C. These results prove clearly the influence of the 2,4-FDCA on the decrease of PET crystallinity.

Regarding thermal stability, if the Td5% is considered, the growing incorporation of 2,4-FDCA into the PET structure seems to decrease dramatically the thermal stability of the polymer as reported in the art due to the intrinsically lower stability of the 2,4-FDCA in comparison to PTA. All polyesters are stable in the processing window typically used in the art to process and use of this kind of polyester, demonstrating that the inventive copolyesters can be used to produce articles advantageously. Moreover, the thermal stability as investigated by $Td_{max}$ indicates a surprisingly high thermal stability of 426° C. for the inventive copolyesters.

In terms of the transparency, the inventive copolyestes presented a smaller transmittance when analyzed versus the comparative example. This demonstrates an advantageous feature of the inventive copolyesters as this property can be linked with desired characteristics of articles made thereof.

Example 7

A study investigated a non-limiting example of the barrier properties of the inventive copolyesters of the present disclosure.

The gas barrier properties were studied Ox-Tran and by Labthink VAC-V2 gas permeability tester at 30° C., relative humidity of 50%, and the $O_2$ and $CO_2$ purity of 99.99%. Films with thickness of ~120 μm were prepared by hot press for this test. All the permeation data reported were the average of more than three measurements. Results are presented in Table 3 in terms or relative barrier improvement factor ($BIF_p$)

TABLE 3

Gas barrier characteristics of the inventive copolyesters and comparative example

| Property | Inventive Copolyester 1 | Inventive Copolyester 2 | Comparative Example |
|---|---|---|---|
| $BIF_p$ $O_2$ (a.u.) | 1.01-1.05 | 1.01-1.10 | 1 |
| $BIF_p$ $CO_2$ (a.u.) | 1.01-1.20 | 1.01-1.30 | 1 |

It has been surprisingly found that the incorporation of 2,4-FDCA units into the PET structure leads to copolymers with better $O_2$ and $CO_2$ gas barrier, which can be advantageously explored to produce articles and containers with higher performance when compared to the art.

The invention claimed is:

1. A copolyester comprising:
    a dicarboxylic acid component A comprising:
        a terephthalic acid residue or ester-forming derivative thereof, or a mixture thereof, and
        a 2,4-furandicarboxylic acid residue or ester-forming derivative thereof, or a mixture thereof, and
    a diol component B comprising an alkanediol residue having from 2 to 22 carbon atoms,
    wherein the dicarboxylic acid component A has a total molar content, and
    wherein the 2,4-furandicarboxylic acid residue or ester-forming derivative thereof, is present in an amount of from 0.1 to 10 mol %, with respect to the total molar content of the dicarboxylic acid component A.

2. The copolyester of claim 1, wherein the 2,4-furandicarboxylic acid residue or ester-forming derivative thereof, is present in an amount of from 0.5 to 5 mol %, with respect to the total molar content of the dicarboxylic acid component A.

3. The copolyester of claim 2, wherein the 2,4-furandicarboxylic acid residue or ester-forming derivative thereof, is present in an amount of from 1 to 3 mol %, with respect to the total molar content of the dicarboxylic acid component A.

4. The copolyester of claim 1, wherein the alkanediol residue is a branched or linear alkanediol having from 2 to 12 carbon atoms.

5. The copolyester of claim 2, wherein the alkanediol residue is a branched or linear alkanediol having from 4 to 6 carbon atoms.

6. The copolyester of claim 1, wherein the alkanediol residue is a cycloalkanediol having from 5 to 10 carbon atoms.

7. The copolyester of claim 1, wherein the alkanediol residue is a cycloalkenediol having from 5 to 10 carbon atoms.

8. The copolyester of claim 1, wherein the alkanediol residue comprises a monoethylene glycol residue.

9. The copolyester of claim 1, wherein the alkanediol residue comprises a propylene glycol residue.

10. The copolyester of claim 1, wherein the alkanediol residue comprises a butylene glycol residue.

11. The copolyester of claim 7, wherein diol component B has a total molar content and wherein the monoethylene glycol is present in an amount of 92.5 mol % or greater, with respect to the total molar content of the diol component B.

12. The copolyester of claim 7, wherein diol component B has a total molar content and wherein the monoethylene glycol is present in an amount of 95 mol % or greater with respect to the total molar content of the diol component B.

13. The copolyester of claim 8, wherein diol component B has a total molar content and wherein the monoethylene glycol is present in an amount of 99 mol % or greater with respect to the total molar content of the diol component B.

14. The copolyester of claim 8, wherein diol component B consists essentially of monoethylene glycol.

15. The copolyester of claim 8, wherein the diol component B comprises two or more of a monoethylene glycol residue, a propylene glycol residue, and a butylene glycol residue.

16. The copolyester of claim 1, wherein the diol component B further comprises an additional hydroxyl-containing residue.

17. The copolyester of claim 16, wherein the diol component B has a total molar content, wherein the additional hydroxyl-containing residue is present in an amount of about 7.5 mol % or less of the total molar content of diol component B.

18. The copolyester of claim 17, wherein the additional hydroxyl containing residue is present in an amount of about 1 mol % or less of the total molar content of diol component B.

19. The copolyester of claim 17, wherein the additional hydroxyl containing residue is present in an amount of about 0.5 mol % or less of the total molar content of diol component B.

20. The copolyester of claim 16, wherein the additional hydroxyl-containing residue is selected from 1,3-propanediol, 1,4-butanediol, 1,5-pentanediol, 2-methyl-1,4-pentanediol, 3-methyl-2,4-pentanediol, trimethyl-1,3-pentanediol, 2-ethyl-1,3-hexanediol, 2,2-diethyl-1,3-propanediol, 1,3-hexanediol, 1,4-di(hydroxyethoxy)benzene, 2,2-bis(4-hydroxycyclohexyl)propane, 2,4-dihydroxy-1,1,3,3-tetramethylcyclobutane, 2,2-bis(3-hydroxyethoxyphenyl)propane, and 2,2-bis(4-hydroxypropoxyphenyl)propane.

21. The copolyester of claim 1, wherein the alkanediol residue is of bio-based origin.

22. The copolyester of claim 1, wherein the dicarboxylic acid component A further comprises one or more additional diacid residues.

23. The copolyester of claim 22, wherein the additional diacid residue is selected from isophthalic acid, naphthalenedicarboxylic acid, cyclohexanedicarboxylic acid, cyclohexanediacetic acid, 2,5-furandicarboxylic acid, succinic acid, glutaric acid, adipic acid, azelaic acid, sebacic acid, and combinations thereof.

24. The copolyester of claim 1, wherein the copolyester has a slower crystallization rate compared to a comparable copolyester comprising isophthalic acid instead of 2,4-furandicarboxylic acid.

25. The copolyester of claim 1, wherein the copolyester has a higher gas barrier to $CO_2$ and $O_2$ of at least 10% when compared to a comparable copolyester comprising isophthalic acid instead of 2,4-furandicarboxylic acid as measured by ASTM D1927-20.

26. The copolyester of claim 1, wherein the copolyester has a higher ratio of $^{14}C$ to $^{12}C$ as measured by ASTM D6866 when compared to a comparable copolyester comprising isophthalic acid instead of 2,4-furandicarboxylic acid.

27. The copolyester of claim 1, wherein the copolyester has an intrinsic viscosity (IV) of from 0.5 dL g-1 to 1.2 dL g-1, as measured according to ASTM D4603-96, at 30° C. in a 0.5 wt % solution of 60/40 phenol/1, 1,2,2-tetrachloroethane.

28. The copolyester of claim 1, wherein the terephthalic acid residue is present in an amount of from 96.5 mol % to about 99.9 mol %, with respect to the total molar content of the dicarboxylic acid component A.

29. A method for preparing a copolyester comprising: subjecting a terephthalic acid or ester-forming derivative thereof, a 2,4-furandicarboxylic acid residue or ester-forming derivative thereof and a C2-C22 alkanediol to polycondensation conditions and subjecting the polycondensation reaction to solid-state polymerization,
wherein the 2,4-furandicarboxylic acid residue or ester-forming derivative thereof is present in an amount of from 0.1 to 10 mol % with respect to a total molar content of the terephthalic acid or ester-forming derivative thereof and the 2,4-furandicarboxylic acid residue or ester-forming derivative thereof.

30. The method of claim 29, wherein the 2,4-furandicarboxylic acid residue or ester-forming derivative thereof, is present in an amount of from 0.5 to 5 mol %, with respect to a total molar content of the terephthalic acid or ester-forming derivative thereof and the 2,4-furandicarboxylic acid residue or ester-forming derivative thereof.

31. The copolyester of claim 29, wherein the 2,4-furandicarboxylic acid residue or ester-forming derivative thereof, is present in an amount of from 1 to 3 mol %, with respect to a total molar content of the terephthalic acid or ester-forming derivative thereof and the 2,4-furandicarboxylic acid residue or ester-forming derivative thereof.

32. The method according to claim 29, wherein the C2-C22 alkanediol is selected from monoethylene glycol, propylene glycol, and butylene glycol.

33. The method according to claim 29, wherein the C2-C22 alkanediol is monoethylene glycol.

34. An article comprising the copolyester according to claim 1.

35. The article according to claim 34, wherein the article further comprises one or more additional polymers.

36. The article according to claim 35, wherein the copolyester according to claim 1 is layered adjacent to the additional polymer.

\* \* \* \* \*